United States Patent [19]

Junker

[11] 4,384,727

[45] May 24, 1983

[54] CIRCUMFERENTIAL RING SEAL ASSEMBLY

[75] Inventor: Arnold Junker, Bridgeport, Conn.

[73] Assignee: Avco Corporation, Stratford, Conn.

[21] Appl. No.: 235,904

[22] Filed: Feb. 19, 1981

[51] Int. Cl.³ ............................................. F16J 15/16
[52] U.S. Cl. ..................................... 277/137; 277/216
[58] Field of Search ......................... 277/216, 197, 137

[56] References Cited

U.S. PATENT DOCUMENTS

| | | | |
|---|---|---|---|
| 1,172,677 | 2/1916 | Davidson | 277/197 |
| 3,405,948 | 10/1968 | Junker | 277/137 |
| 3,430,967 | 3/1969 | Junker | 277/137 |

*Primary Examiner*—Robert I. Smith
*Attorney, Agent, or Firm*—Ralph D. Gelling

[57] ABSTRACT

A ring seal assembly 20 is disclosed for reducing leakage about a part, such as a shaft or a piston cylinder having a surface of circular cross section. The assembly includes primary and secondary seal rings 22, 24, having radially inner and outer peripheral surfaces. The primary seal ring includes a radially extending gap 32 which permits the ring to expand. The rings are disposed in aligned, face-to-face contacting relationship, with the secondary seal ring being bonded to the primary seal ring at a point adjacent one side of the gap formed in the primary seal ring. The diameter of the peripheral surface of the primary seal ring, which is adapted to abut the circular surface of the part, substantially conforms to the diameter of the circular surface. The corresponding peripheral surface of the secondary seal ring includes a first portion or dam 40, which is aligned with the gap in the primary seal ring and has a curvature substantially conforming to the curvature of the primary seal ring. The remaining portion 42 of the peripheral surface of the secondary seal ring is undercut, relative to the peripheral surface of the primary seal ring. A biasing spring 36 is provided for urging the conformed peripheral surface of the primary seal ring into sealing relationship with the part such that leakage is reduced in both the axial and radial directions, while the part is permitted to radially expand.

3 Claims, 8 Drawing Figures

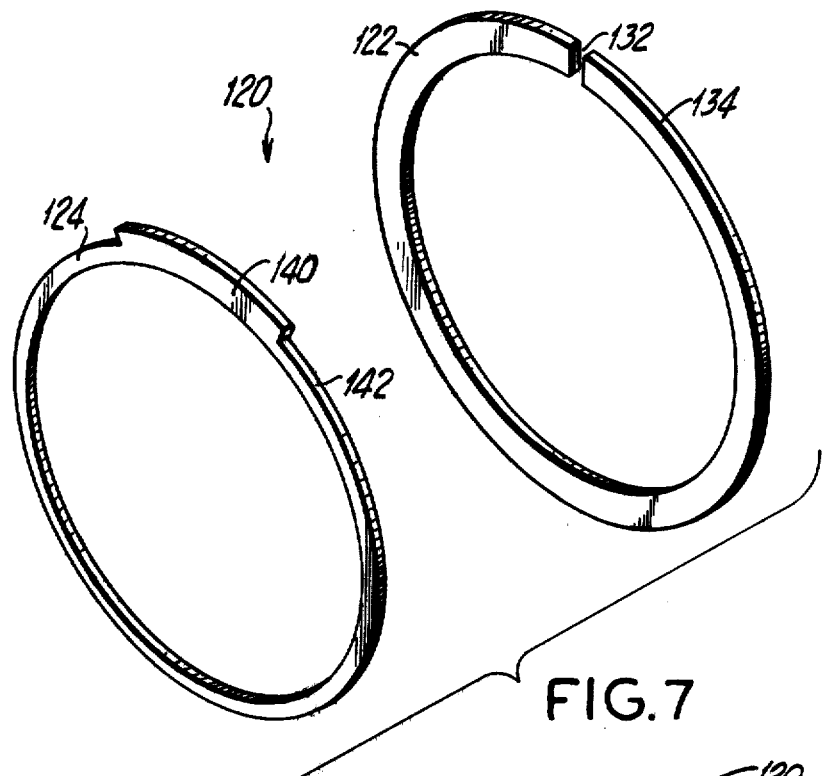
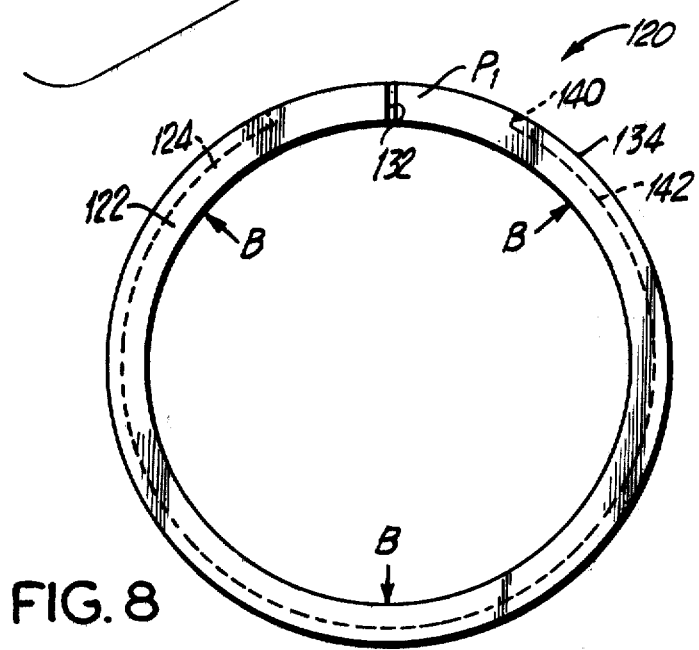

CIRCUMFERENTIAL RING SEAL ASSEMBLY

BACKGROUND OF THE INVENTION

The subject invention relates to a ring seal assembly for reducing leakage about a part while permitting the part to radially expand under varying thermal conditions. More particularly, a ring seal assembly is disclosed for use with a part such as a shaft or piston cylinder, having a circular cross section. The assembly includes primary and secondary seal rings which are bonded together to substantially reduce leakage in both the axial and radial directions.

In the prior art, various sealing ring assemblies have been developed for use with moving parts to inhibit the leakage of fluids therearound. For example, ring seals have been developed which are mounted about rotating power shafts to prevent the leakage of lubricating fluids outwardly along the cylindrical surface of the shaft. Similarly, seal assemblies have been developed which are mounted about a piston for forming a sealing engagement with the wall of the piston cylinder.

Solid ring seals having radially inner and outer peripheral surfaces have been employed in simple low power devices. However, it is recognized that in the majority of high power engine applications, temperatures are generated which require ring seal assemblies that can accommodate the thermal expansion of the parts. More specifically, a solid sealing ring which was machined to conform to the dimensions of a cold shaft would shatter as the shaft expanded. Conversely, a solid ring machined to conform to the dimensions of an expanded shaft would not provide adequate sealing during the initial start-up stage of the engine.

A common ring seal assembly which has been developed to accommodate the thermal expansion of a part includes a seal ring having a radially extending gap or split. The split seal ring is provided with a radially inner diameter substantially conforming to the diameter of the cold shaft. As the temperature of the engine rises and the rotating shaft expands, the radially extending gap provided in the split ring permits the ring to expand along with the shaft. Preferably, a biasing means such as a garter spring is provided around the outer peripheral surface of the split ring to urge the inner surface thereof into sealing engagement with the rotating shaft.

Typically, a split ring is operative to eliminate approximately 98% of leakage about a rotating shaft. However, as can be appreciated, the radially extending gap in the ring does allow a small amount of axial leakage. In most high performance engine applications, leakage must be substantially eliminated. Accordingly, various expedients have been developed which are used in conjunction with a split ring in an effort to eliminate any leakage associated therewith. One example of such a ring seal assembly is disclosed in U.S. Pat. No. 3,430,967, issued Mar. 4, 1969 and assigned to the same assignee as the subject invention. In the assembly disclosed in the latter patent, a primary split ring is provided having an inner diameter substantially conforming to the diameter of the cold shaft. In addition, a solid secondary seal ring is provided wherein the radially inner peripheral surface includes a first portion or dam having a curvature substantially conforming to the curvature of the primary seal ring. The remaining portion of the radially inner surface of the secondary seal ring is undercut to allow for the thermal expansion of the shaft. In use, the primary and secondary rings are non-rotationally mounted in a seal case about a rotating shaft. The primary and secondary rings are disposed in face-to-face contacting relationship with the dam of the secondary ring being aligned directly behind the gap in the primary split ring. By this arrangement, the dam portion of the secondary ring functions to seal any axial leakage permitted by the gap in the split ring.

The sealing assembly disclosed in U.S. Pat. No. 3,430,967 is highly effective in eliminating leakage when the primary and secondary sealing rings are accurately machined. However, it was found that the overall effectiveness of mass produced seals is dependent upon the accuracy and talent of the machinist. More specifically, if the radially inner surfaces of the rings and particularly the dam portion of the secondary seal were not machined to the exact size of the shaft, some axial leakage would result. In order to minimize this effect, the secondary ring is provided with a dam which extends about 120° of its circumference. As the angular extent of the arc of the dam is increased, any machining errors in the curvature may result in the shaft resting on the opposed end points of the dam, creating a gap which permitted the escape of fluids. On the other hand, if the angular extent of the arc of the dam is reduced, the ring seals tend to wobble about the shaft also permitting leakage. Accordingly, by providing a dam having 120° arc extension, both problems are substantially minimized. However, even when the secondary ring is provided with 120° dam, the total effectiveness of the seals are still dependent upon the skill of the machinist.

Accordingly, it is an object of the subject invention to provide a new and improved ring seal assembly which substantially eliminates leakage, while significantly simplifying the manufacture thereof.

It is another object of the subject invention to provide a new and improved ring seal assembly which substantially reduces leakage, while permitting the parts to radially expand under varying thermal conditions.

It is a further object of the subject invention to provide a new and improved ring seal assembly for reducing the leakage about a part such as a shaft or a piston cylinder having a surface of circular cross section.

It is still another object of the subject invention to provide a new and improved ring seal assembly which includes a primary split seal ring and a solid secondary seal ring, the latter being disposed in aligned, face-to-face relationship with the primary ring and bonded thereto at a point adjacent one side of the gap in the split ring. By this arrangement, leakage is substantially eliminated while machining of the ring seal assembly is significantly simplified. Further, the bonding of the rings tends to equalize the radial pressure on the elements resulting in a corresponding equalization of wear thereby increasing the life of the assembly.

SUMMARY OF THE INVENTION

In accordance with these and many other objects, the subject invention provides for a ring seal assembly including primary and secondary ring seals having radially inner and outer peripheral surfaces. The primary ring seal is provided with a radially extending gap or split which permits the ring to expand. The primary and secondary ring seals are disposed in aligned, face-to-face relationship with the secondary seal ring being bonded to the primary seal ring at a point adjacent one side of the gap formed in the primary seal ring. By this arrangement, the primary and secondary seal rings may be machined simultaneously, while the primary ring may still expand.

In one preferred embodiment of the subject invention, for use with a rotating shaft, the diameter of the radially inner peripheral surface of the primary seal ring substantially conforms to the diameter of the shaft. The radially inner peripheral surface of the secondary seal ring includes a first portion or dam having a curvature identical to the curvature of the primary seal ring. The remaining portion of the inner surface of the solid secondary seal ring is undercut, relative to the primary seal ring, to allow for the expansion of the shaft. The dam of the secondary seal ring is aligned with the gap in the primary seal ring. A biasing means such as a garter spring is provided around the primary seal ring to urge the inner surface thereof into sealing relationship with the rotating shaft. In operation, the split in the primary ring permits the ring to expand and conform to the diameter of the expanding shaft. The dam portion of the secondary ring functions to block off any axial leakage escaping through the split in the primary seal ring.

By producing the primary and secondary seal rings as a single unit, the dam portion of the secondary ring can be machined simultaneously with the machining of the primary ring to insure that their curvatures are substantially identical. Further, the angular extent of the dam may be significantly reduced because the bonding of the rings insures that their relative spatial locations remain constant. By this arrangement, the problem associated with a large dam, wherein the shaft might rest on the opposed end points thereof, is substantially eliminated. In the preferred embodiments of the subject invention, the angular extent of the dam is reduced to below 90° and is preferably on the order of 40°-45°.

In an alternate embodiment of the subject invention, a ring seal assembly is provided for use in conjunction with a piston cylinder. As in the first embodiment of the subject invention, a primary split ring is bonded to a secondary solid ring. In this embodiment of the subject invention, the diameter of the radially outer peripheral surface of the primary ring substantially conforms to the diameter of the piston cylinder. The dam of the secondary seal ring is disposed on the radially outer peripheral surface thereof, aligned with the gap in the primary split ring. The curvature of the dam substantially conforms to the curvature of the outer peripheral surface of the primary ring. Similar to the first embodiment, the remaining portion of the outer peripheral surface of the secondary seal ring is undercut, relative to the outer peripheral surface of the primary seal ring. A biasing means is provided for urging the outer peripheral surface of the primary ring into sealing relationship with the wall of the piston cylinder. As pointed out above, the unitary construction of the ring seal assembly permits the outer peripheral surface thereof to be machined simultaneously thereby simplifying construction and insuring that adequate sealing is provided in both the axial and radial directions, while the piston cylinder is permitted to expand under varying thermal conditions.

These and many other objects and advantages of the subject invention will become apparent from the following detailed description in conjunction with the drawings in which:

BRIEF DESCRIPTION OF THE DRAWINGS

FIG. 7 is an exploded perspective view of an alternate embodiment of the ring seal assembly of the subject invention for use in conjunction with a piston cyliner.

FIG. 8 is an end elevational view of the alternate embodiment of the ring seal assembly of the subject invention as seen from the right side of FIG. 7.

DESCRIPTION OF THE PREFERRED EMBODIMENTS

Figure 1:
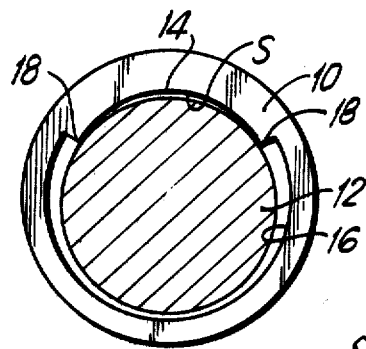
FIG. 1 is a schematic view of a solid secondary ring of the prior art in conjunction with a shaft, illustrating the space between the shaft and the dam which can result from inaccurate machining.

Referring to FIG. 1, there is illustrated a prior art solid, secondary seal ring 10 as used in conjunction with a rotating shaft 12. The secondary seal ring 10 includes a first portion or dam 14 having a curvature substantially conforming to the curvature of the shaft 12. As illustrated in FIG. 1, dam 14 has an angular extent, around the circumference of the radially inner surface of about 120°. The remaining portion 16 of the inner surface of the secondary seal ring 10 is undercut to provide clearance for the thermal expansion of the shaft 12.

As discussed above, the prior art ring seal assembly, when accurately machined, is effective in preventing leakage. However, in practice, when the curvature of the dam 14 is not accurately machined, the periphery of the shaft tends to abut the opposed ends 18 of the dam, breaking the seal between the shaft and the dam. While the dimensions of FIG. 1 have been exaggerated for illustrative purposes, it is apparent that a space S is created between the shaft 12 and the dam 14. The space S permits fluids which have leaked axially through the gap in the split ring (not shown) to escape.

Figure 3:
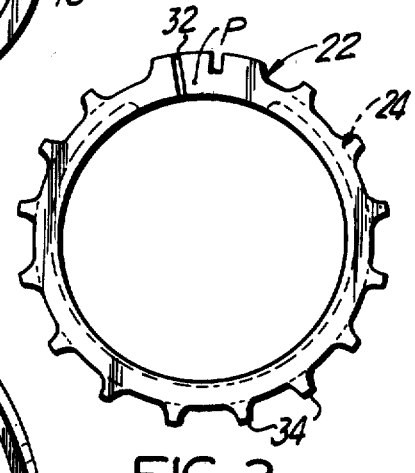
FIG. 3 is an end elevational view, as seen from the left from FIG. 2, of the new and improved ring seal assembly of the subject invention.
Figure 2:
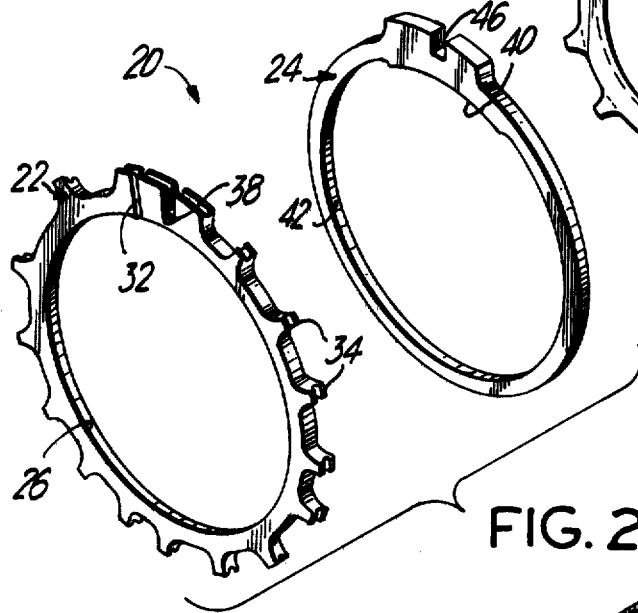
FIG. 2 is an exploded perspective view of a first embodiment of the primary and secondary seal rings of the subject invention.
Figure 4:
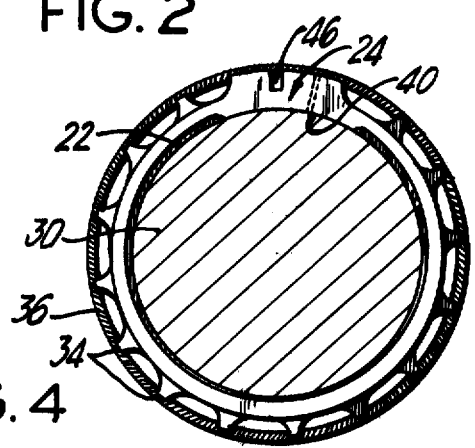
FIG. 4 is an opposed, end elevational view of a new and improved ring seal assembly of the subject invention as used in conjunction with a shaft.

Referring now to FIGS. 2-4, there is illustrated a new and improved ring seal assembly 20 of the subject invention wherein the difficulty of machining conforming curvatures is significantly reduced. More specifically, the subject invention includes a primary split seal ring 22 and a secondary solid seal ring 24. Both rings are preferably formed from carbon, and finished to a high degree of flatness to improve sealing. The inner peripheral surface 26 of the primary split ring 22 is provided with a diameter substantially conforming to the diameter of the shaft 30. Primary ring 22 includes a radially extending gap or split 32 to permit the raidal expansion of the ring as the shaft 30 expands under varying thermal conditions. The outer peripheral surface of primary ring 22 is provided with a scalloped configuration for increasing the flexibility of the ring. The scalloped configuration is defined by upstanding members 34 each of which may be provided with a recess or channel for accommodating a biasing means such as a garter spring 36. Garter spring 36 is provided to urge the inner peripheral surface 26 of the primary ring into sealing relationship with shaft 30. In certain applications, the resiliency of the ring 22 alone is sufficient to bias the inner surface thereof into sealing relationship with the shaft 30 such that the spring 36 is unnecessary. The outer peripheral surface of the primary ring 22 is further provided with a pin receiving notch 38. As discussed more fully hereinbelow, pin receiving notch 38 is adapted to receive an anti-rotational pin provided on a seal case to prevent the ring seal assembly from rotating during use.

The inner peripheral surface of secondary seal ring 24 includes a first portion or dam 40 which, as illustrated in FIGS. 3 and 4, has a curvature substantially identical to the curvature of the inner surface of primary ring 22. The remaining portion 42 of the inner surface of the secondary seal ring 24 is undercut to accommodate the expansion of the shaft and maintain engagement with the dam and shaft. The amount of undercut will vary for different applications. For example, if the diameter of the shaft is expected to expand approximately 7,000ths of an inch, an undercut of 15,000ths of an inch is preferable. The outer peripheral surface of secondary ring 24 is also provided with a groove 46 adapted to receive an anti-rotational pin.

The primary and secondary seal rings 22 and 24 are disposed in face-to-face contacting relationship. The secondary seal ring 24 is located such that the dam 40 is disposed in alignment with the gap 32 of the primary seal ring 22. In accordance with the subject invention, secondary ring 24 is bonded to the primary ring 22 at a point P adjacent one side of gap 32. An epoxy type bond may be used for low operating temperatures, however, at high operating temperatures, special bonding techniques, such as atomic bonding or molten particle spray bonding are required because the coefficient of epansion of the bond must be equal to the coefficient of expansion of the rings. By bonding the secondary ring to the primary ring along one side of gap 32, the primary ring is permitted to freely expand to accommodate the expansion of the shaft. The bonding of the rings further functions to maintain the dam 40 of the secondary ring in alignment with the gap 32 of the primary ring 22.

As discussed above, when manufacturing the ring seal assembly 20 of the subject invention, it is intended that the final machining of the dam portion 40 of the secondary ring 24 be carried out simultaneously with the machining of the curvature of the inner peripheral surface 26 of the primary ring 22. By this arrangement, the curvatures of the dam 20 and the primary ring 22 are substantially identical.

As illustrated in FIG. 4, the ring seal assembly 20 of the subject invention is operative to eliminate leakage around the shaft 30. More specifically, primary ring 22 is biased inwardly by garter spring 36 such that the diameter thereof can vary and remain in substantial conformity with the configuration of the expanding shaft. As discussed above, primary ring 22 is a highly effective seal except in the area of gap 32. Accordingly, secondary ring 24 is provided to prevent any escape of fluids which could leak axially through gap 32. By bonding the rings together, the relative spacial orientation therebetween remains fixed, insuring proper alignment of the gap 32 and the dam 40. This fixed relationship also permits a reduction of the angular extent of the dam 40. This reduction simplifies machining and eliminates the above discussed prior art problem wherein the shaft becomes spaced away from the dam. The extent of the arc of the dam 40 should be less than 90° and preferably in the range of 40°-45°.

Figure 5:
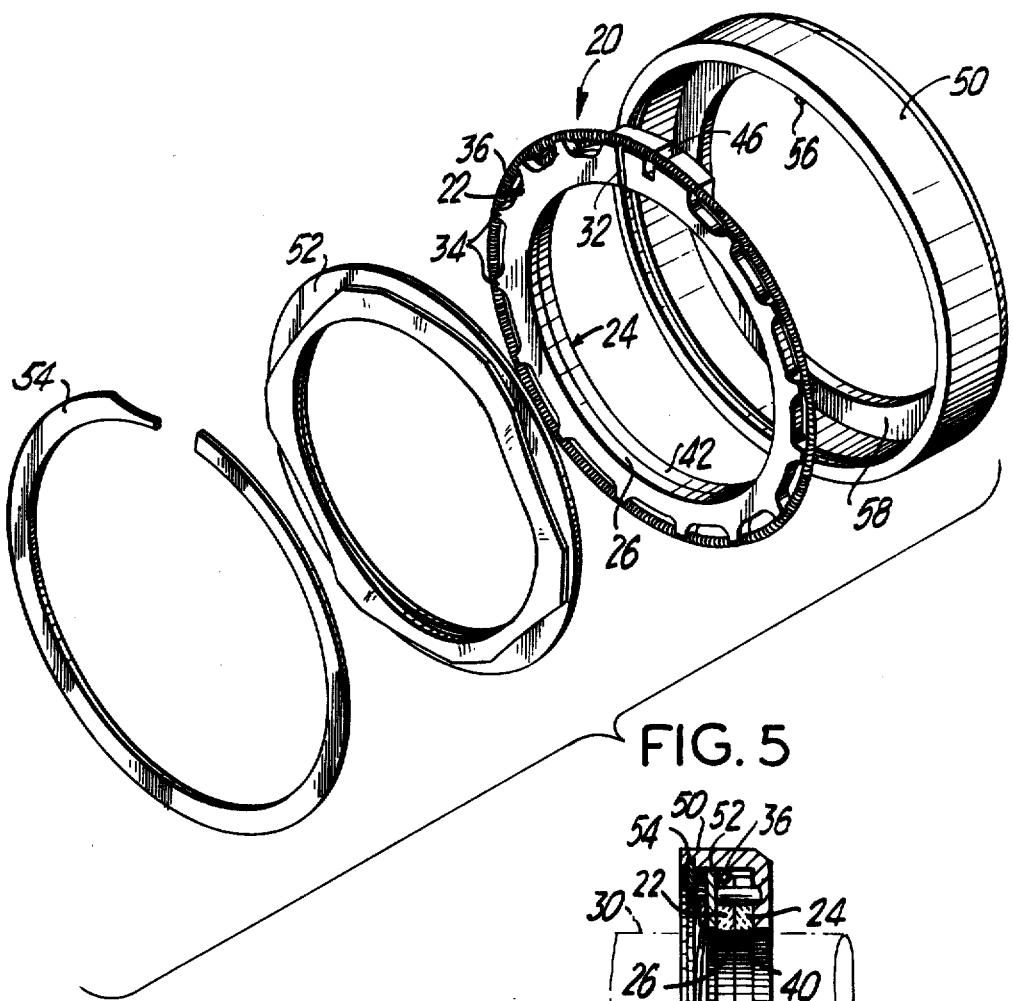
FIG. 5 is an exploded perspective view of the first embodiment of the new and improved ring seal assembly of the subject invention illustrating a seal casing and biasing springs used in a typical installation.
Figure 6:
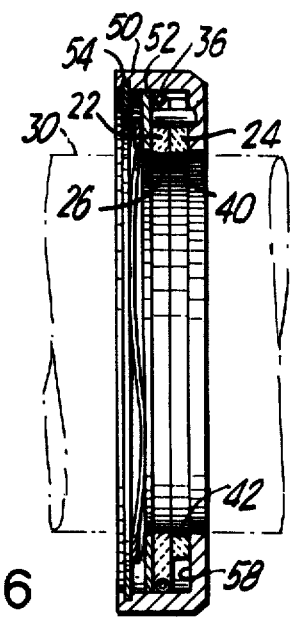
FIG. 6 is a cross sectional view of the new and improved ring seal assembly of the subject invention, illustrated in FIG. 5, shown installed on a shaft.

Referring now to FIGS. 5 and 6, the new and improved ring seal assembly 20 of the subject invention is illustrated in a typical arrangement for use in conjunction with a shaft 30, shown in phantom. More specifically, a seal case 50 is provided for housing the ring seal assembly 20 along with suitable biasing means such as a waist spring 52 and a snap ring 54. Seal case 50 has a diameter adapted to accept the ring seal assembly 20 and includes an anti-rotational pin 56. When ring seal assembly 20 is mounted in seal case 50, anti-rotational pin 56 is received in the aligned grooves 38 and 46 of the ring seal assembly 20. Due to the high rotational speeds of the shaft, any friction between the shaft and the inner surfaces of the rings will create a twisting moment. Anti-rotational pin 56 is provided to prevent the spinning of the ring seal assembly 20 which could result in ring fracture due to centrifugal forces.

Wavy or waist spring 52 is provided to securely bias the ring seal assembly 20 in an axial direction against the end plate 58 of the seal case 50. By this arrangement, leakage between the seal ring assembly 20 and the seal case 50 is elminated. Snap ring 54 is used to lock the waist spring 52 and ring seal assembly 20 within the seal case. In the alternative, finger springs (not shown) can be utilized. While particular biasing means are illustrated, it is intended that any suitable biasing means, which locks and forces the ring seal assembly in an axial direction against the end plate of the seal case be included within the scope of the subject invention.

The subject ring seal assembly was mounted on a shaft of a high performace jet engine for testing purposes. The shaft was run at 70,000 revolutions per minute at 800° F. No leakage was observed after 8 hours and only slight moisture was observed after 200 hours.

Referring now to FIGS. 7 and 8, there is illustrated an alternate embodiment of the subject invention for use in conjunction with a piston cylinder. More specifically, ring seal assembly 120 may be mounted about a piston (not shown) such that the radially outer surface thereof forms a sealing engagement with the inner circumference of the piston cylinder (not shown). Similar to the first embodiment of the subject invention, the ring seal assembly 120 includes a primary ring 122 and a secondary ring 124. Primary ring 122 includes a gap 132 to permit the expansion of the ring. In accordance with the subject invention, the outer perpheral surface 134 of primary ring 122, which is adapted to be disposed in sealing relationship with the piston cylinder, is provided with a diameter substantially conforming to the diameter of the piston cylinder. Secondary ring 124 is bonded to primary ring 122 in face-to-face contacting relationship at point P1 adjacent gap 132.

Similar to the first embodiment of the subject invention, secondary ring 124 includes a dam 140 which is aligned with gap 132 of the primary ring and has a curvature substantially conforming to the curvature of the outer peripheral surface of primary ring 122. The remaining portion 142 of the outer peripheral surface of secondary ring 124 is undercut away from the outer peripheral surface of the primary ring. The undercut portion 142 allows for the expansion of the walls of the piston cylinder under varying thermal conditions.

In use, the ring seal assembly is mounted about a piston in a suitable manner. For example, the cylindrical piston may be provided with an annular groove for accommodating the ring seal assembly. A biasing means indicated by arrows B in FIG. 8 may be interposed between the groove in the piston and the ring seal assembly 120. Biasing means B is provided to urge the outer peripheral surface of the primary ring 122 into sealing relationship with the inner surface of the piston cylinder. As in the first embodiment of the subject invention, the primary ring 122 functions to substantially eliminate all fluid or gas leakage except in the area of the gap 132. In accordance with the subject invention, dam portion 140 of the secondary ring 124 functions to eliminate any axial leakage which might escape through gap 132. The angular extent of dam 140 is less than 90° and is preferably in the range of 40°–45°. The curvature of the dam may be machined simultaneously with the curvature of the outer peripheral surface 134 of the primary ring 122. In applications such as a piston cylinder arrangement, wherein the ring seal assembly 120 is subjected to constant frictional movement, the rings are preferably formed from metal.

In summary, there is provided a new and improved ring seal assembly for reducing leakage about a part, while permitting the part to radially expand under varying thermal conditions. The ring seal assembly of the subject invention may be used in conjunction with, for example, a shaft or a piston cylinder having a surface of circular cross section. The ring seal assembly includes primary and secondary seal rings having radially inner and outer peripheral surfaces. The rings are disposed in face-to-face contacting relationship. The primary seal ring includes a radially extending gap allowing the ring to expand. The secondary seal ring is bonded to the primary seal ring at a point adjacent one side of the gap in the primary seal ring. One peripheral surface of the primary seal ring, which is intended to be disposed in sealing relationship with the circular surface of the part to be sealed, has a diameter substantially conforming to the diameter of the circular surface. The secondary ring includes a dam portion having a curvature substantially conforming to the curvature of the peripheral surface of the primary seal ring. The dam of the secondary seal ring is aligned with the gap in the primary split ring. The remaining portion of the peripheral surface of the secondary seal ring is undercut to allow for the expansion of the part. A biasing means is provided for urging the peripheral surface of the primary seal ring into sealing relationship with the circular surface of the part such that the ring seal assembly is operative to reduce leakage about the part in both the axial and radical directions, while permitting the part to radially expand. In addition, the bonding of the rings tends to equalize the radial pressure on the elements resulting in a corresponding equalization of wear thereby increasing the life of the assembly.

While the subject invention has been described with reference to preferred embodiments, it will be apparent to those skilled in the art that various changes and modifications can be made therein without varying from the spirit and scope of the subject invention as defined by the appended claims.

What is claimed is:

1. A ring seal assembly for reducing leakage about a part, such as a shaft, having a cylindrical surface, while permitting said part to radially expand under varying thermal conditions, said ring seal assembly comprising:

a resilient, primary carbon seal ring including a radially inner circmferential sealing surface having a diameter substantially conforming to the diameter of said part and disposed in sealing relationship therewith said primary seal ring including a radially extending gap to permit the radial expansion of said primary carbon seal ring;

a secondary carbon seal ring having a radially inner circumferential sealing surface, said secondary seal ring being disposed in aligned, face-to-face contacting relationship with said primary seal ring and bonded thereto at a point adjacent one side of said radial gap, with said inner circumferential surface of said secondary seal ring including a first dam portion aligned with said gap of said primary seal ring and having a curvature substantially conforming to the curvature of said inner circumferential surface of said primary seal ring, and with the remaining portion of the inner circumferential surface of said secondary seal ring being undercut relative to said inner circumferential surface of said primary seal ring to permit the expansion of the cylindrical surface of said part;

first biasing means for urging said inner circumferential surface of said primary seal ring into sealing relationship with said cylindrical surface of said part;

a seal case having an axially extending cylindrical outer wall and a radially extending end plate, said primary and secondary seal rings being non-rotationally mounted within said seal case;

second biasing means for axially urging said primary and secondary seal rings into sealing relationship with said end plate of said seal case; and means for locking said second biasing means and said primary and secondary seal rings within said seal case whereby said seal ring assembly is operative to reduce leakage about said part in both the axial and radial directions while permitting said part to radially expand.

2. A ring seal assembly as recited in claim 1 wherein the angular extent of said dam portion of said secondary seal ring, about the circumference of said inner circumferential surface, is in the range of 40° to 45°.

3. A ring seal assembly as recited in claim 1 wherein the bond between said primary and secondary seal rings has a coefficient of expansion equal to the coefficient of expansion of the rings.

* * * * *